Patented Feb. 11, 1947

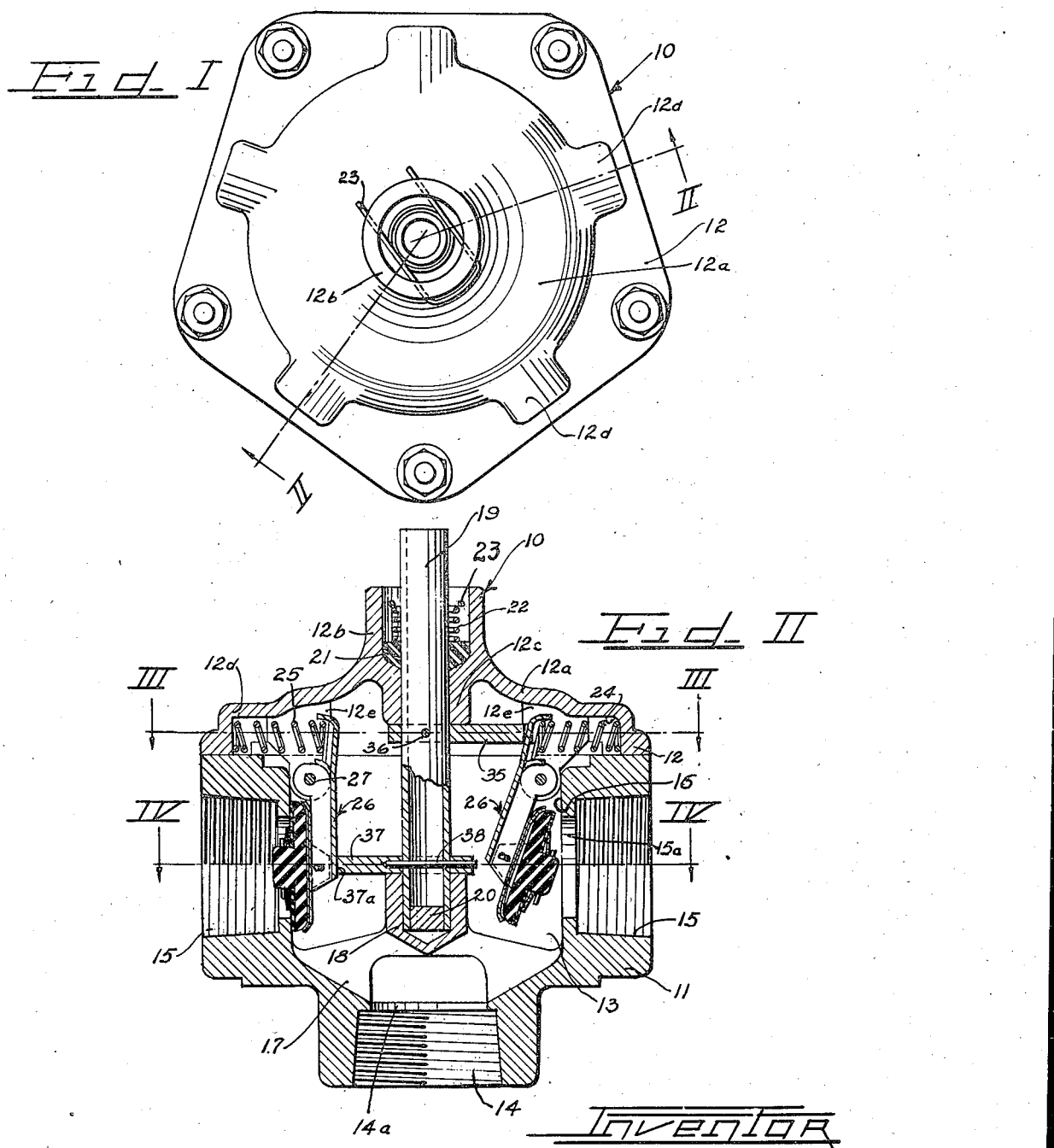

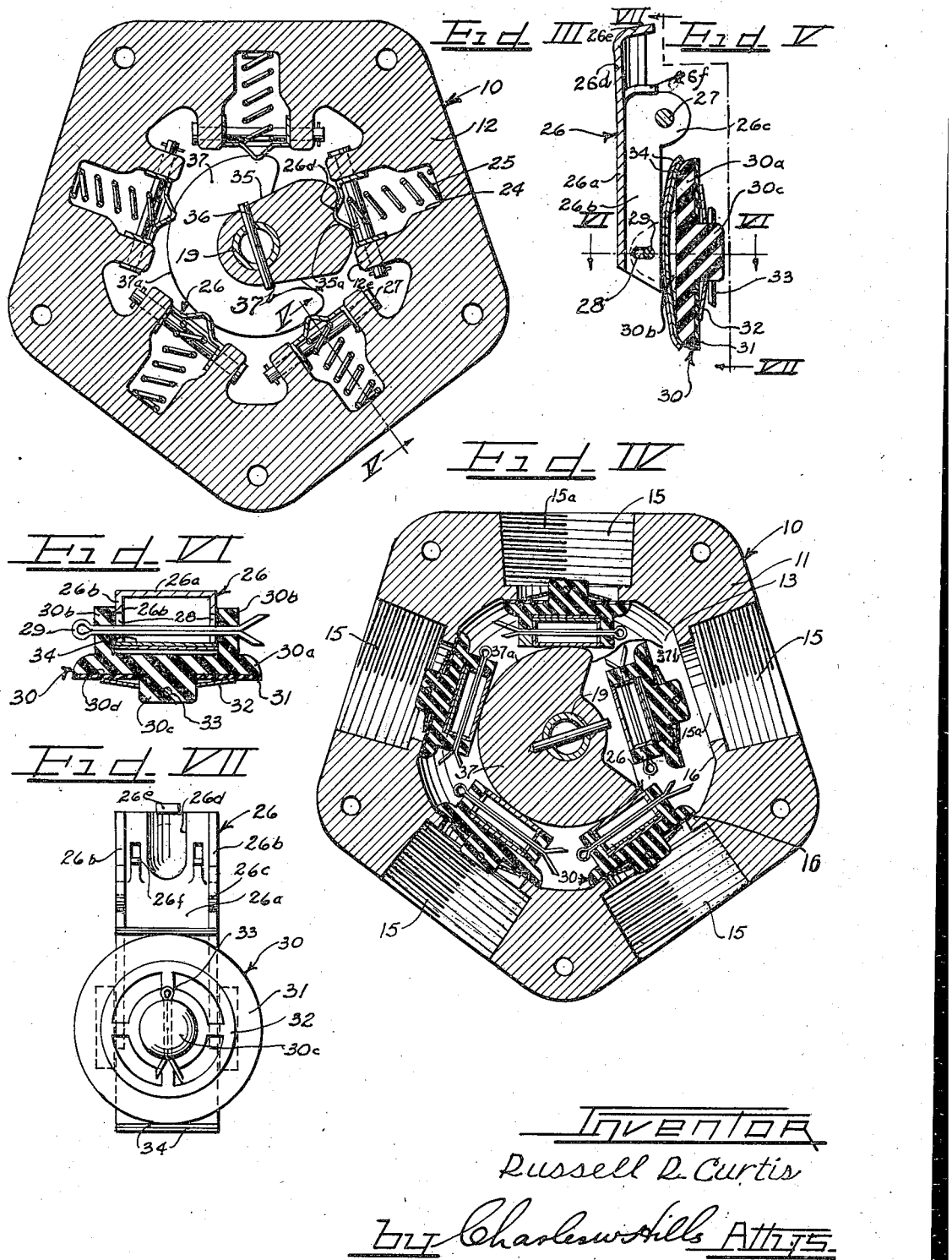

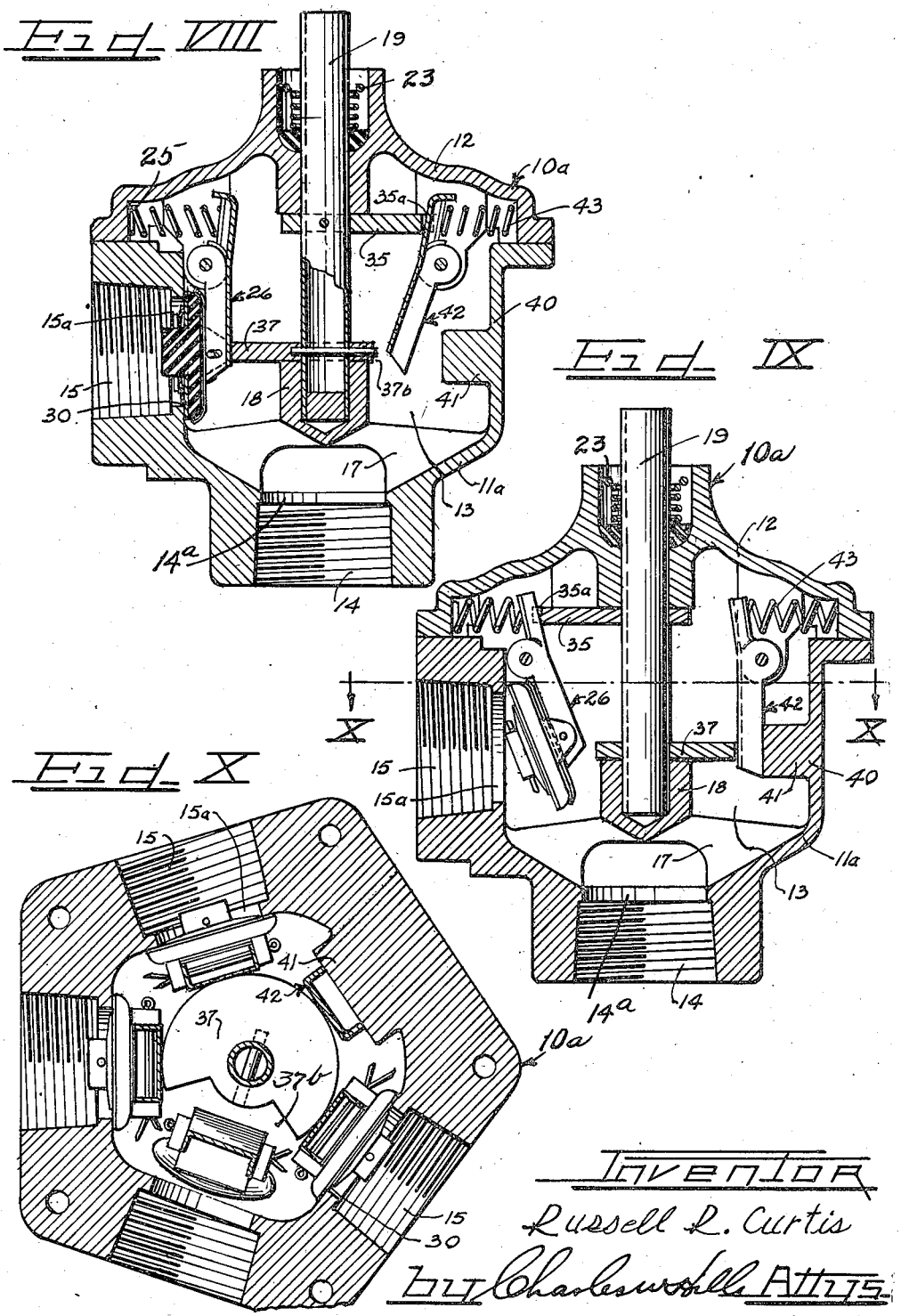

2,415,466

UNITED STATES PATENT OFFICE 2,415,466

SELECTOR VALVE

Russell R. Curtis, Dayton, Ohio, assignor, by mesne assignments, to Curtis Automotive Devices, Inc., Dayton, Ohio, a corporation of Ohio Application March 6, 1943, Serial No. 478,214

13 Claims. (Cl. 277—20)

This invention relates to fluid flow control devices for selectively connecting fluid flow conduits.

Specifically the invention relates to an aircraft fuel selector valve adapted to deliver fuel from any one of a number of fuel tanks on the aircraft.

While the invention will hereinafter be specifically described as embodied in an aircraft fuel tank selector valve, it should be understood that the fluid flow control devices of this invention are not limited to such usage, being generally applicable for the control of fluid flow from a plurality of sources of supply to a single delivery line, or vice versa, from a single source of supply to any one of a selected number of delivery lines.

In aircraft fuel systems, fuel is selectively fed to the aircraft engine from any one of a number of fuel tanks provided on the aircraft. The devices of this invention are especially adapted for supplying fuel to an aircraft engine from a selected one of the plurality of tanks provided on the aircraft. The devices of this invention offer little or no resistance to fluid flow and are readily operated.

In accordance with this invention a casing is provided with an axial outlet port and a plurality of radial inlet ports. Valve heads or disks are pivotally suspended in the casing adjacent each radial inlet port and are spring urged to closed position against the ports. A rotatable operating shaft is carried by the casing and has an opening cam thereon adapted to selectively act on one swingably suspended valve head at a time to move this valve head away from its port and thereby connect the port for fluid flow with the axial outlet port. A locking cam is also provided on the shaft to cooperate with the springs urging the valve heads to closed position for locking all of those valve heads in closed position that are not being acted on by the opening cam. The opening cam and the locking cam are so arranged on the shaft that the locking cam will act on all of the valve heads to hold them against their ports except that valve head which is moved away from its port by the opening cam.

The opening cam has a notch or recess adapted to cooperate with a protuberance on each of the valve head suspension means so that the operator will feel the seating of the protuberance in the notch or recess of the cam. This arrangement provides a position finder. In installations where the fluid control device is to have an "off" position a suspension means with a protuberance can be provided adjacent a blind or closed wall of the casing to coact with the opening cam as a position finder for the closed or "off" position.

Leaf springs are provided between the valve heads or disks and the suspension means for these heads or disks. These springs permit increased tolerance limits of the parts and also serve to hold the valve heads or disks against vibration when the valves are in open position.

The devices of this invention need not be held to close manufacturing tolerance limits and can be formed largely of synthetic plastics.

It is, then, an object of this invention to provide a fluid flow control device equipped with swingably suspended cam actuated valve heads.

A further object of the invention is to provide a selector valve having a plurality of individually pivotally suspended valve means adapted to be selectively actuated to open and closed positions.

A further object of the invention is to provide a selector valve composed almost entirely of plastic material and capable of efficient operation without the necessity for maintenance of close tolerance limits.

A further object of the invention is to provide a selector valve having pivotally suspended valve heads urged by springs into seated engagement with ports and actuated to opened position by a rotatable shaft operated cam.

Another object of the invention is to provide an aircraft fuel selector valve that is exceptionally light in weight, inexpensive, and easy to operate.

A further object of the invention is to provide a selector valve wherein the parts will operate efficiently even though they are not carefully fitted.

Other and further objects of the invention will be apparent to those skilled in the art from the following detailed descriptions of the annexed sheets of the drawings which, by way of preferred examples only, illustrate two embodiments of the invention.

On the drawings:

Figure 1 is a top plan view of a fuel selector valve according to this invention;

Figure 2 is a vertical cross-sectional view, with parts in elevation, taken along the line II—II of Figure 1;

Figure 3 is a horizontal cross-sectional view, with parts in elevation, taken along the line III—III of Figure 2;

Figure 4 is a horizontal cross-sectional view, with parts in elevation, taken along the line IV—IV of Figure 2;

Figure 5 is an enlarged vertical cross-sectional view, taken along the line V—V of Figure 3;

Figure 6 is a horizontal cross-sectional view with parts in elevation, taken along the line VI—VI of Figure 5;

Figure 7 is a side elevational view, taken along the line VII—VII of Figure 5;

Figure 8 is a horizontal cross-sectional view, similar to Figure 2, of a selector valve in completely closed position and equipped with a dummy lever to act as a position finder for the closed position;

Figure 9 is a view similar to Figure 8 but illustrating the valve of Figure 8 in an open position;

Figure 10 is a horizontal cross-sectional view taken along the line X—X of Figure 9.

As shown on the drawings:

As shown in Figures 1 to 4 inclusive a fuel selector valve 10 includes an open-topped cup-like casing 11 and a removable cover 12 for the open top of the casing secured thereto by means of bolts or studs.

The casing 11 defines an operating chamber 13 and has an internally threaded hollow boss portion 14 depending axially from the bottom communicating through a port 14a with the operating chamber 13 to form an outlet passageway from the chamber. The threaded boss 14 can receive a delivery line (not shown), such as, for example, the fuel line to an airplane engine.

A plurality of internally threaded hollow portions 15 are provided in spaced relation around the side wall of the casing 11 and connect with the operating chamber 13 through radial ports 15a. Five radial ports 15a and hollow portions 15 are shown but it should be understood that any number could be used. Each internally threaded portion 15 is adapted to receive a separate supply line (not shown) from the various fuel tanks (not shown) of an airplane.

A flat annular wall 16 is provided in the operating chamber 13 around each port 15a to serve as a valve seat.

As best shown in Figure 2 the casing 11 has a spider 17 expanding the outlet port 14a thereof and carrying a closed bottom hollow boss 18 at the axial center of the operating chamber 13.

The cover 12 has a circular dome 12a with a central hollow boss 12b projecting upwardly therefrom and a smaller hollow boss 12c depending beneath the boss 12b into the interior of the assembly as shown in Figure 2. An operating shaft 19 extends through the bosses 12b and 12c of the cover into the chamber 13 and into the boss 18 and is rotatably supported in the bosses 12c and 18. The shaft 19 is preferably hollow as shown and has a plug 20 pressed into the lower end thereof adapted to prevent leakage out of the casing through the shaft.

Packing material 21 can be bottomed in the boss 12b and held in the bottom of the boss by means of a spring 22 embracing the shaft 19. A U-shaped wire clamp 23 straddles the shaft 19 to be disposed over the spring 22 for holding the spring under compression in the boss 12b. The clamp 23 extends through holes provided in the boss 12b.

The shaft 19 is thus rotatably mounted in the cover 12 and in the casing 11 through bearings provided by the boss portion 12c of the cover and the boss 18 of the casing.

The dome 12a of the cover has hollow radially extending bosses 12d positioned over each hollow portion 15 of the casing to form radial recesses 24 for coil springs 25.

The dome 12a of the cover also has pairs of ears 12e depending therefrom to continue each recess 24 and extending into the operating chamber 13 of the casing 11 with each pair of ears being positioned adjacent each hollow portion 15 of the casing.

A lever assembly indicated generally by the reference numeral 26 is pivotally supported between each pair of ears 12e on a pin 27 extending through the ears and through the lever assembly.

As shown in Figures 5 to 7 each lever assembly 26 is composed of a stamped sheet metal channel strip with a flat face 26a and side flanges 26b with rounded apertured ear portions 26c adapted to receive the pin 27 therethrough and fit between a pair of ears 12e of the cap. The ears 26c are intermediate the top and bottom of the lever 26. A portion of the face 26a above the ears 26c is stamped inwardly to leave a central protuberance 26d to be acted on by a valve opening cam as will hereinafter be more fully described.

A tang 26e is bent over from the top of the face 26 to project rearwardly as shown. Kerfs 26f are stamped out of the face 26a and bent rearwardly on each side of the protuberance 26d. The tang 26e and the kerfs 26f serve as abutment means for the spring 25 to center the end of the spring on the face 26a around the protuberance 26d.

The lever assembly 26 thus is pivotally mounted between the ears 12e and has a portion above its pivot 27 acted on by a spring carried in a recess 24 of the cover. This spring urges the lower end of the lever assembly toward a port 15a.

The side flanges or walls 26c of each lever assembly 26 have transversely elongated slots 28 therethrough near the bottom end thereof. These slots 28 receive a cotter pin 29 therethrough pivotally carrying a valve head assembly 30. Each valve head assembly 30 includes a plastic disk 30a with a pair of spaced opposed ears 30b extending rearwardly therefrom to straddle the side walls or flanges 26b of the lever and receive the cotter pin 29 therethrough.

A circular boss 30c projects from the central portion of the other face of the disk and receives therearound a synthetic rubber impregnated fabric washer 31. A metal spring washer 32 is also disposed around the boss 30c and bottomed on the fabric washer 31 to hold the said washer against the flat face 30d of the disk. A cotter pin 33 is passed through the boss 30c to hold the spring washer 32 in stressed or loaded condition so that it will thrust against the fabric washer 31.

A pair of spring plates or spring leaves 34 are positioned between the ears 30c. These plates or leaves 34 are bottomed on the side walls or flanges 26b of the lever assembly and have the ends thereof acting on the valve head assembly 30. The ends of the plates or leaves can be slightly bent into conformity with the edge contour of the valve disk 30a to embrace the top and bottom of the disk. The spring leaves urge the valve head assembly 30 away from the lever assembly and cause the cotter pin 29 to seat in the ends of the slots 28 which are disposed adjacent the free edges of the side walls or flanges 26b.

The spring 25 acting on the top ends of the lever assemblies, as explained above, will move the lower ends of the lever assemblies toward the ports 15a. However since the valve head assemblies 30 are pivotally supported on these lower ends of the lever assemblies the valve heads will be moved toward the ports to seat the fabric washers 31 on the seats 16 around the ports 15a. Since the valve heads are pivotally mounted on the lower ends of the levers, they are of course, free to swing into full face to face engagement with the valve seats 16. The spring washers 32, as best shown in Figures 4 and 7, are of a diameter intermediate the diameter of the boss 30c and the diameter of the disk 30a so that they can fit into the ports 15a and leave free marginal portions of the fiber washers 31 for seating on the seats 16. The springs 25 will thus urge the valve heads into positions for closing each of the ports.

Fabric washers 31 eliminate the necessity for an accurate lap-fit on the valve seat 16 since this material is resiliently yieldable and will compensate for inaccurate surfaces on the valve seat.

As shown in Figure 2 the shaft 19 carries a valve opening cam 35 just under the boss 12c. The cam 35 can be welded, brazed or otherwise secured to the shaft 19. As illustrated, a pin 36 is passed through the shaft and cam to hold the cam against rotation on the shaft.

As shown in Figure 3 the cam 35 has a notch 35a in the free end thereof adapted to receive the protuberances 26d of the lever assemblies 26. These protuberances 26d ride over the free end of the cam 35 as the cam is rotated into juxtaposition with the particular lever assembly and the cam swings the lever assembly against pressure of the spring 25 to move the valve head off of its seat and thereby open the port. When the protuberance 26d drops into the recess or notch 35a of the cam the operator feels a reaction on a handle or control rod (not shown) of the shaft 19 and thereby knows that a particular port is opened. The notch and protuberance thus cooperates to provide a position finder for the valve.

The cam 35 as it is rotated in the operating chamber 13 selectively engages one lever assembly at a time to open the port controlled by that particular assembly and thereby joins the open port with the outlet passageway 14 of the casing.

A second cam 37 is secured on the shaft 19 above the boss 18 in casing 11 by means of a pin such as 38 or might be brazed or welded to the shaft.

The cam 37 has a segmental circular cam edge 37a adapted to act on the faces 26a of all except one of the lever assemblies 26 beneath their pivots 27 for locking the valve heads 30 into tight seated engagement with their seats 16. The cam has a relieved portion 37b aligned with the cam 35 so that the cam 37 will not act on that lever assembly that is being acted on by the cam 35.

The cam 37 thus serves as a locking means for the valve assemblies to cooperate with the springs 25 for holding these assemblies against their seats. The cam 37 prevents fluid pressure in the ports 15 from urging the valves to open position.

From the above description it will be understood that the shaft 19 can be rotated to move its cams for selectively opening one valve assembly 30 at a time while locking all of the other valve assemblies in closed position against their seats. As a result of this construction fuel from a selected tank can be supplied to a delivery line connected with the discharge outlet 14 of the valve casing.

Rather loose pivot connections can be used throughout the construction so that close tolerances need not be maintained. The casing, the cover, and the valve disks can all be composed of molded synthetic plastic material. The lever assemblies, the shaft, the pins, the spring washers and the spring leaves can be made of metal.

The cooperation between the protuberances 26d and the notch 35a is such that the valve opened by the cam 35 will initially be opened to more than fully opened position and will then drop back into the notch 35a to give the operator a reaction on the shaft 19 regarding the position of the cam.

In Figures 8 to 10 the selector 10a is substantially identical with the valve 10 of Figures 1 to 4 and identical parts have been marked with the same reference numerals. However in the valve 10a the casing 11a only has four inlets 15 while the portion of the casing normally having a fifth inlet is provided with a closed wall 40 carrying a boss 41 projecting into the operating chamber 13. This boss 41 bottoms a dummy assembly 42 similar to the lever assemblies 26. This dummy lever assembly is acted on by the opening cam 35 in the same manner as the lever assemblies 26. However, when the locking cam 37 is acting on all of the lever assemblies 26 the valve 10a is completely closed and none of the inlet ports are in communication with the discharge outlet 14.

A spring 43 for the dummy lever assembly normally holds this assembly against the boss 41 in which position of course, the cam 37 will not be effective to act on it. Then when the shaft 19 is rotated to bring the cam 35 into engagement with the dummy lever assembly for compressing the spring 43 and moving the assembly off the boss 41 the cam 37 is in an out of the way position so that the lever can swing into the relieved portion 37b of the cam. The operator will feel the reaction of the dummy lever assembly dropping into the notch 35a of the cam 35 and will know that the valve is in closed or "off" position.

If desired, different cam shapes can be used to selectively open a plurality of valves at a time. For example, the cam 35 could be shaped to simultaneously swing two levers 26 to open the valves on these levers while the cam 37 could be relieved at points permitting such swinging of two levers.

It will, of course, be understood that various details of construction may be varied through a wide range without departing from the principles of this invention and it is, therefore, not the purpose to limit the patent granted hereon otherwise than necessitated by the scope of the appended claims.

I claim as follows:

1. A fluid flow control device comprising a casing defining an operating chamber with a plurality of ports therearound, valves pivotally suspended in said chamber for controlling flow through said ports, a rotatable shaft extending into said chamber, a first cam in said chamber on said shaft acting on said valves to selectively swing the valves away from said ports for opening the ports, and a second cam on said shaft to selectively swing the valves toward said ports for closing the ports.

2. A fluid flow control device comprising a casing defining an operating chamber with a plurality of ports therearound, valves pivotally suspended in said chamber for controlling flow through said ports, springs urging said valves into closed position relative to said ports, a rotatable shaft extending into said chamber, a first cam in said chamber on said shaft for selectively acting on a valve to swing the same away from its port for opening this port, and a second cam in said chamber on said shaft for acting on all of the valves except the one acted on by said first cam to lock said valves into seated engagement with said ports whereby one of the ports will be opened and all the rest of the ports will be closed.

3. A fluid flow control device comprising a casing defining an operating chamber with a plurality of radial ports therearound and an axially disposed port, a shaft rotatably supported in said casing and extending into said operating chamber, levers swingably mounted on said casing in said operating chamber adjacent each radial port, a valve head pivotally supported on each lever for closing the adjacent port, a spring acting on each lever to urge the valve head into closed position in said port, a cam on said shaft in said chamber adapted to selectively engage a lever for compressing the spring acting thereon to swing the lever for carrying the valve head away from its port to open the port, and a second cam in said chamber on said shaft for acting on all of the levers except that one being acted on by the first mentioned cam to lock the valve heads against their ports thereby sealing said ports whereby the axial port is selectively placed in communication with a radial port.

4. A selector valve comprising a casing having a central open topped operating chamber and a discharge outlet through the bottom thereof together with a plurality of inlet passageways disposed radially therearound, a cover for the open top of the casing having a hollow dome portion with a central apertured boss, a shaft rotatably mounted in the central apertured boss of the cover, a spider integral with said casing carrying a central boss in the operating chamber, said shaft extending into said spider carried boss to be rotatably mounted therein, pairs of ears depending from the dome portion of the cover into said operating chamber adjacent each radial port thereof, a lever disposed between the ears of each pair, a pin extending through said ears and through said lever intermediate the ends of said lever for pivotally suspending the lever, springs bottomed in the dome portion of said cover acting on the ends of the levers to swing the other ends toward the ports, valve heads pivotally carried by said levers for opening and closing said ports, a cam on said shaft acting on the upper ends of said levers to swing the valve heads away from said ports, and a second cam on said shaft acting on the lower ends of said levers for locking the valve heads against said ports.

5. In a selector valve having an axial port, a plurality of radial ports, and an operating chamber between the axial port and the radial port, a lever swingably mounted in the operating chamber adjacent each of the radial ports, a valve head pivotally and slidably mounted on each lever for acting on the adjacent port to open and close the port, a spring between each valve head and lever arranged to press the valve head against its port when the lever is moved to port closing position and cam means for acting on said levers to selectively swing the same for controlling the positions of the valve heads and for locking the valve heads in port closing positions whereby said axial port is selectively placed in communication with a radial port.

6. A selector valve comprising a generally cup-shaped molded plastic casing having an outlet passageway through the bottom thereof and radial inlet passageways disposed in spaced relation around the sides thereof, said casing providing annular valve seats around each radial passageway, a molded plastic cover for the open top of said casing, a plurality of levers swingably suspended from said cover to project into the casing each in front of a radial port, springs carried by the cover acting on said levers for urging the same toward the radial ports, a valve head carried by each lever adapted to seat on the valve seat provided in the casing, each valve head having a resiliently yieldable seating face, a control shaft extending through said cover and rotatably carried therein, a first cam on said control shaft for selectively engaging the levers to swing the same away from the valve seats, and a second cam on said shaft adapted to act on all of the levers except the one being acted on by the first cam for holding the valve heads against said valve seats.

7. A selector valve comprising a generally cup-shaped casing providing a central open topped operating chamber, said casing having a discharge outlet in the bottom thereof and a spider spanning said outlet carrying a shaft bearing support in axial alignment with said outlet, said casing also having a plurality of outlet ports disposed radially around the side walls thereof, a cover for the open top of said casing, levers pivotally supported by said cover depending into the operating chamber each in front of a radial port, a valve head pivotally supported on each lever for closing the radial ports, spring means acting on each lever urging the valve head into closed position, a shaft extending through said cover and rotatably mounted in said bearing support, and cam means on said shaft for selectively engaging the levers to swing the same for carrying the valve head away from the radial ports whereby the radial ports are selectively placed in communication with the outlet openings.

8. In a selector valve, a lever assembly comprising a channel strip having apertured sides intermediate the ends thereof, a protuberance projecting from the face of said strip above the apertures in the sides thereof, a spring acting on said strip, tangs adjacent said protuberance projecting between the sides of the strip for centering said spring on the strip, and a valve head pivotally supported on the strip at an end thereof remote from the end having the protuberance thereon.

9. In a valve assembly, a valve head having a pair of aligned ears projecting from one face thereof and a central boss projecting from the other face thereof, a channel strip having the sides thereof disposed between said ears, pin means extending through the sides of the channel strip and through said ears for pivotally supporting the valve head on the strip, a leaf spring between said channel strip and said head for urging the valve head away from the channel strip, a yieldably resilient washer disposed around said boss and seated on the adjacent face of the valve head, and spring means disposed around said boss acting on said washer to hold the same on said face.

10. A selector valve comprising a housing providing a plurality of inlet ports, an outlet port, and an operating chamber between the inlet and outlet ports, levers swingably mounted in said operating chamber each adjacent an inlet port, valve heads pivotally mounted on said levers for opening and closing said inlet ports, each of said levers having a round protuberance thereon, a shaft extending into said operating chamber, and a pair of cams on said shaft, a first cam having a notched periphery for acting on the protuberances of said levers to serve as a position finder for the assembly, said first cam selectively swinging said levers to move the valve heads away from the ports for opening the ports and a second cam selectively swinging said levers to move the valve heads toward the ports for closing the ports.

11. A selector valve comprising a housing having an axial discharge outlet and a plurality of spaced radial inlets, and an operating chamber between the outlet and said inlet, said housing providing a valve seat in the operating chamber around each inlet, means swingably mounted in said housing adjacent each inlet, a valve head pivotally suspended from said swingably mounted means in said operating chamber adjacent each inlet adapted to seat on said valve seat, and cam means in said operating chamber for swinging said swingably mounted means to move said valve heads toward and away from said valve seat.

12. A selector valve comprising a housing having an axial outlet, a plurality of radial inlets disposed around a portion thereof, an operating chamber between the outlet and said inlet, and a closed wall in the portion of the housing not equipped with inlets, a lever assembly pivotally supported on said housing in said operating chamber adjacent each inlet, a valve head pivotally mounted on each lever assembly, a dummy lever pivotally mounted on said housing in front of the closed wall portion of the housing, each of said lever assemblies and said dummy lever having a rounded protuberance thereon, a shaft rotatably supported in said housing and extending into said operating chamber, a pair of cams on said shaft, a first cam having a periphery with a notch therein adapted to receive the rounded protuberances of said lever assemblies and said dummy lever, said cam selectively swinging the lever assemblies for moving the valve heads away from the inlets and said dummy lever away from the closed wall of the housing to serve as a position finder for the closed position of the selector valve and a second cam selectively swinging the lever assemblies for moving the valve heads toward their inlets and the dummy lever toward the closed wall of the housing.

13. A selector valve comprising a casing with a plurality of radial ports therearound and a blind wall portion between two adjacent ports, a boss projecting from said blind wall portion, lever assemblies pivotally supported in said housing, a valve head pivotally mounted on each lever assembly adjacent each inlet to open and close the inlet, a dummy lever adjacent the blind wall of the housing adapted to engage said boss, springs urging said lever assemblies and said dummy lever to move the valve heads into closed positions in the ports and to move the dummy lever against the boss, and a pair of cam means one of which selectively acts on said lever assemblies and said dummy lever to swing the valve heads away from the ports and to swing the dummy lever away from the boss, said dummy lever serving as a position finder for the closed position of the selector valve and the other of which selectively acts on the lever assemblies to swing the valve heads against the ports and the dummy lever against the boss.

RUSSELL R. CURTIS.

REFERENCES CITED

The following references are of record in the file of this patent:

UNITED STATES PATENTS

| Number | Name | Date |
|---|---|---|
| 1,126,937 | Barnstead | Feb. 2, 1915 |
| 1,234,726 | Bruckner | July 31, 1917 |
| 1,304,519 | Walker | May 20, 1919 |
| 1,829,276 | Guthmuller | Oct. 27, 1931 |
| 2,219,982 | Downey | Oct. 29, 1940 |
| 2,299,615 | Downey | Oct. 20, 1942 |